United States Patent [19]

Bederke et al.

[11] Patent Number: 5,698,330

[45] Date of Patent: Dec. 16, 1997

[54] COATING COMPOSITIONS FOR TRANSPARENT TOPCOAT LACQUER LAYERS AND THE USE THEREOF IN PROCESSES FOR THE PRODUCTION OF MULTI-LAYER LACQUER COATINGS

[75] Inventors: Klaus Bederke, Sprockhovel; Friedrich Herrmann; Hermann Kerber, both of Wuppertal; Thomas Kutzner, Sprockhovel; Heinz Walter Reifferscheidt, Bochum, all of Germany

[73] Assignee: Herberts GmbH, Germany

[21] Appl. No.: 591,485

[22] PCT Filed: Mar. 23, 1995

[86] PCT No.: PCT/EP95/01095

§ 371 Date: Jan. 22, 1996

§ 102(e) Date: Jan. 22, 1996

[87] PCT Pub. No.: WO95/26375

PCT Pub. Date: Oct. 5, 1995

[30] Foreign Application Priority Data

Mar. 26, 1994 [DE] Germany .................. 44 10 609.2

[51] Int. Cl.⁶ .................. B32B 15/08; B32B 27/08; C08F 216/04; C08F 220/26
[52] U.S. Cl. .................. 428/423.1; 428/423.3; 428/423.7; 428/424.4; 427/385.5; 427/388.2; 427/388.3; 427/407.1; 427/409; 525/124; 525/127
[58] Field of Search ................ 525/124, 127; 427/385.5, 388.2, 388.3, 407.1, 409; 428/423.1

[56] References Cited

FOREIGN PATENT DOCUMENTS

| 0314447 | 5/1989 | European Pat. Off. . |
| 4226270 | 2/1994 | Germany . |
| 1158079 | 6/1989 | Japan . |
| 9307932 | 4/1993 | WIPO . |
| 9315849 | 8/1993 | WIPO . |

OTHER PUBLICATIONS

Database WPI, week 8931, Derwent Publications Ltd., London, GB; AN 223234 Thermosetting Clear Coating Composition.

*Primary Examiner*—Patricia A. Short
*Attorney, Agent, or Firm*—Merchant, Gould, Smith, Edell, Welter & Schmidt, P.A.

[57] ABSTRACT

The present invention is directed to a coating composition for use as topcoat lacquer on a multi-layer lacquer coating for substrates such as automobile bodies and parts. The coating composition is based upon a combination of hydroxyl-functional methacrylic copolymers, carboxy-functional blocked urethane prepolymers, crosslinking agents and optional hydroxyl-functional polyesters. The carboxy-functional polyurethane prepolymer is formed from a combination of organic diols, polycarboxylic acids, polyols, hydroxyl-carboxylic acids, aliphatic or aryl polyisocyanates and monofunctional isocyanate blocking agents. The lacquer coating according to the invention has a high sulfuric acid resistance and has a high solids content.

17 Claims, No Drawings

COATING COMPOSITIONS FOR TRANSPARENT TOPCOAT LACQUER LAYERS AND THE USE THEREOF IN PROCESSES FOR THE PRODUCTION OF MULTI-LAYER LACQUER COATINGS

This invention relates to coating compositions which are suitable, in particular, for transparent as well as pigmented stoved multi-layer coatings, for example in automotive original lacquer coating, which coating compositions are distinguished by elevated "acid rain" resistance and an elevated application solids content.

Japanese patent Kokai no. 1(1989)-158079 describes coating compositions based on caprolactone-modified polyacrylate resins optionally additionally containing hydroxyalkyl (meth)acrylates, alkylated melamine resins and optionally blocked polyisocyanates. While high-solids automotive lacquer coatings may indeed be produced with such coating compositions, industrially required levels of acid rain resistance are not achieved. The clear lacquers tend to yellow and have low initial gloss.

DE-A-42 04 518 describes non-aqueous transparent topcoat lacquers based on synthetic resins containing hydroxyl groups, amino resins and blocked polyisocyanates, wherein the latter are blocked both with dialkyl malonates and with blocking agents containing methylene groups or oximes. In this case, too, the acid resistance of the resultant lacquer coatings is not entirely satisfactory.

The object of the present invention was to provide coating compositions for stoved multi-layer coatings, in particular for automotive original lacquer coating, which compositions both have an elevated application solids content (high solids) and result in coatings with elevated acid resistance, in particular improved resistance to sulphuric acid.

It has been found that the requirement for sulphuric acid resistant and simultaneously high-solids coating formulations may be satisfied by coating compositions which contain one or more hydroxy-functional (meth) acrylic copolymers, carboxy-functional, blocked urethane prepolymers, crosslinking agents and optionally hydroxyfunctional polyester resins, conventional lacquer additives and solvents. The coating compositions are characterised in that they contain binders based on A) 5.0 to 40.0 wt. % of one or more carboxy-functional urethane prepolymers with a hydroxyl value of 0 to 80, an acid value of 5 to 50 and a weight average molecular weight ($M_w$) of 500 to 5000, which are obtainable by reacting a1) 10 to 50 mol. % of one or more alkanediols or cycloalkanediols, a2) 10 to 30 mol. % of one or more polycarboxylic acids or the anhydrides thereof, a3) 0 to 30 mol. % of one or more polyols with at least three OH groups per molecule, a4) 0 to 20 mol. % of one or more hydroxycarboxylic acids with at least one hydroxyl group and at least one carboxyl group per molecule, a5) 10 to 40 mol. % of one or more aliphatic, cycloaliphatic and/or araliphatic di- and/or polyisocyanates and a6) 10 to 40 mol. % of one or more monofunctional blocking agents for free NCO groups, wherein the sum of the mol. % of a1) to a6) amounts to 100 mol. % in each case, B) 30.0 to 70.0 wt. % of one or more (meth) acrylic copolymers containing hydroxyl groups with a weight average molecular mass ($M_w$) of 2000 to 20000, an acid value of 1 to 50 mg KOH/g and an OH value of 30 to 200, C) 0 to 50.0 wt. % of one or more hydroxy-functional polyesters with an OH value of 40 to 200 and D) 5.0 to 40.0 wt. % of one or more additional crosslinking agents differing from component A), wherein the sum of wt. % of components A) to D) amounts to 100 wt. % in each case.

The carboxy-functional and optionally also hydroxyfunctional, blocked urethane prepolymers (component A) which are contained in the coating compositions according to the invention may be produced in various manners from components a1) to a6). Production may proceed using a single-vessel method or, preferably, in stages. They may be produced in stages, for example, by esterification of alkanediols with polycarboxylic acids or the anhydrides thereof, optionally using polyols and/or hydroxycarboxylic acids with at least one hydroxyl group and at least one carboxyl group per molecule, to yield oligomeric OH- and COOH-functional polycondensation products. The reactants may be reacted at elevated temperature, for example at temperatures of 120° to 240° C., until the desired degree of polycondensation is achieved.

The polycondensation intermediate obtained in this manner may then be reacted with aliphatic, cycloaliphatic and/or araliphatic di- and/or polyisocyanates at elevated temperature, for example at 40° to 100° C.

The excess NCO groups remaining from urethanisation are completely reacted with conventional blocking agents, for example CH-acidic, NH- and/or OH-functional compounds. Examples of CH-acidic compounds are acetoacetic ester, acetylacetone, dialkyl malonate, such as diethyl malonate; examples of OH-functional compounds-are alkanone oximes, alkanols and phenols; examples of NH compounds are lactams, such as caprolactam, NH-functional heterocyclics, such as imidazole and pyrazole derivatives. The blocking agents may be used individually or as a mixture. The carboxy- and optionally hydroxy-functional, blocked urethane prepolymers conveniently exhibit an NCO value of below 0.1.

The alkanediols and cycloalkanediols which may be used as component a1) are in particular low molecular weight compounds. Examples are alkanediols with 2 to 6 carbon atoms, such a ethylene glycol, propanediol, butanediol, neopentyl glycol and hexanediol; examples of cycloalkanediols are those with 5 or 6 carbon atoms, such as cyclohexanediol, but also compounds such as cyclohexanedimethanol. Particularly preferred alkanediols are those which are branched in position 2. 2,2-Dialkyl-alkanediols are particularly preferred, particularly those with more than 5 C atoms per molecule. 2,2-Dialkyl-1,3-alkanediols, in particular with more than 5 C atoms per molecule, are particularly preferred; examples of these are 2-ethyl-2-butyl-1,3-propanediol, 2-ethyl-2-hexyl- 1,3-propanediol, 2-ethyl-2-ethylhexyl-1,3-propanediol, 2,2-di-tert.-butyl-1,3-propanediol, 2,2-diethyl-1,3-propanediol, 2-Ethyl-2-hexyl-1,3-propanediol and 2,2-diethyl-1,3-propanediol are preferably used.

Polycarboxylic acids or the anhydrides thereof, in particular dicarboxylic acids, are used as component a2). These may be aromatic and preferably aliphatic or cycloaliphatic. Examples of aromatic dicarboxylic acids are phthalic acid, terephthalic acid, isophthalic acid and trimellitic acid. Examples of aliphatic dicarboxylic acids are succinic acid, adipic acid, sebacic acid, dodecanedicarboxylic acid. Cycloaliphatic dicarboxylic acids are particularly preferred, for example 1,2-, 1,3-and 1,4-cyclohexanedicarboxylic acid and 1,2-cyclohexane-dicarboxylic anhydride.

Polyols with at least three OH groups per molecule may be used as component a3). These preferably contain at least two primary OH groups. Examples of these are trimethylolpropane and pentaerythritol. Those polyols having at least one secondary OH group in addition to at least two primary OH groups are particularly preferred. Examples of these are glycerol and 1,2,6-hexanetriol.

Hydroxycarboxylic acids may be used as component a4). Hydroxycarboxylic acids with a tertiarily attached carboxyl groups are particularly preferably used. Preferred examples of these are 2,2-dialkyl-ω-hydroxyalkyl-1-carboxylic acids, wherein the alkyl residues have, for example, 1 to 6 carbon atoms. Specific examples are 2,2-dimethylolpropionic acid and 3-hydroxypivalic acid.

Aliphatic, cycloaliphatic and araliphatic diisocyanates and polyisocyanates are particularly suitable as the diisocyanates and polyisocyanates (component a5). Preferably used diisocyanates are hexamethylene 1,6-diisocyanate, 3,5,5-trimethylhexamethylene 1,6-diisocyanate, isophorone diisocyanate, 1,3-bis-(isocyanatomethyl)cyclohexane, bis-isocyanatocyclohexyl-methane, tetramethylxylylene diisocyanate (TMXDI).

Polyisocyanates containing biuret groups are moreover, for example, suitable as polyisocyanates (component a5), for example reaction products prepared from 3 mol of hexamethylene diisocyanate with 1 mol of water with an NCO content of approximately 22%, or polyisocyanates containing isocyanurate groups, which are produced, for example, by trimerising 3 mol of hexamethylene diisocyanate with an NCO content of approximately 21.5%, or polyisocyanates containing urethane groups, which are, for example, reaction products of 3 mol of aliphatic or cycloaliphatic diisocyanates with 1 mol of triol, for example, trimethylolpropane. Isophorone diisocyanate is the preferably used aliphatic diisocyanate.

The blocking agents (component a6) which may be used are those, for example, CH-acidic, NH- or OH-functional compounds conventional for blocking purposes which, under curing conditions, promote crosslinking with hydroxy-functional binders. Specific examples of blocking agents which may be used are the same as already stated above. It may be favourable here simultaneously to use various capping agents, which may be achieved within a single polyisocyanate molecule or in the mixture.

During the production of component A), components a1) to a6) are used in ratios such that the desired hydroxyl values, acid values and molecular weights are achieved and a latent NCO value of more than 3 is obtained. The latent NCO value is taken to be the NCO value achieved on complete elimination of the blocking agents.

The (meth) acrylic copolymers (component B) contained in the coating compositions according to the invention may be produced, for example, using conventional polymerisation methods, for example bulk, solution or bead polymerisation. The various polymerisation methods are well known and are described, for example, in Houben-Weyl, *Methoden der Organischen Chemie*, 4th edition, volume 14/1, pages 24–255 (1961).

Solution polymerisation is preferred for the production of the (meth)acrylic copolymers used in the coating compositions according to the invention. In this method, the solvent is initially introduced into the reaction vessel, heated to boiling temperature and the monomer/initiator mixture continuously apportioned over a certain period of time. Solution polymerisation may, however, also be performed in such a manner that the monomers are added in a temporally spaced manner, i.e. alternately or successively.

Polymerisation is performed, for example, at temperatures of between 60° C. and 160° C., preferably at 80° C. to 140° C.

The polymerisation reaction may be initiated with known polymerisation initiators. Suitable initiators are conventional per and azo compounds which decompose thermally in a first order reaction to yield free radicals. The type and quantity of initiator are selected such that, at the polymerisation temperature, the supply of free radicals is as far as possible constant during the feed phase.

Examples of preferably used initiators for the polymerisation are: dialkyl peroxides, such as di-tert.-butyl peroxide, dicumyl peroxide; diacyl peroxides, such as dibenzoyl peroxide, dilauroyl peroxide; hydroperoxides, such as cumene hydroperoxide, tert.-butyl hydroperoxide; peresters, such as tert.-butyl perbenzoate, tert.-butyl perpivalate, tert.-butyl per-3,5,5-trimethylhexanoate, tert.-butyl per-2-ethylhexanoate; peroxydicarbonates, such as di-2-ethylhexyl peroxydicarbonate, dicyclohexyl peroxydicarbonate; perketals, such as 1,1-bis-(tert.-butylperoxy)-3,5,5-trimethylcyclohexane, 1,1-bis-(tert.-butylperoxy) cyclohexane; ketone peroxides, such as cyclohexanone peroxide, methyl isobutyl ketone peroxide; azo compounds, such as 2,2'-azobis-(2,4-dimethylvaleronitrile), 2,2'-azobis-(2-methylbutyronitrile), 1,1'-azobiscyclohexanecarbonitrile, azobisisobutyronitrile.

The polymerisation initiators, in particular the peresters, are preferably used in a quantity of 0.2 to 5 wt. % relative to the weighed amount of monomers.

Suitable organic solvents which are conveniently used during solution polymerisation and also subsequently in the coating compositions according to the invention are, for example, glycol ethers, such as ethylene glycol dimethyl ether; glycol ether esters, such as ethylene glycol monoethyl ether acetate, ethylene glycol monobutyl ether acetate, 3-methoxy-n-butyl acetate, diethylene glycol monobutyl ether acetate, methoxypropyl acetate, esters, such as butyl acetate, isobutyl acetate, amyl acetate; ketones, such as methyl ethyl ketone, methyl isobutyl ketone, diisobutyl ketone, cyclohexanone, isophorone; alcohols, such as methanol, ethanol, propanol, butanol; aromatic hydrocarbons, such as xylene, Solvesso 100 (registered trade mark) and aliphatic hydrocarbons may likewise be used, particularly when blended with the above-stated solvents.

Particularly in the preferred solution polymerisation, conventional chain transfer agents may also be used to control molecular weight. Examples are functionalised or non-functionalised mercaptans, such as mercaptoethanol, n-octylmercaptan, thioglycolic acid esters, chlorinated hydrocarbons, cumene, dimeric α-methylstyrene.

Polymerisation conditions (reaction temperature, feed time of the monomer mixture, solution concentration) are arranged such that the (meth)acrylic copolymers for the coating composition produced according to the invention have a weight average molecular mass ($M_w$) (determined by gel permeation chromatography using polystyrene as the calibrating substance) of between 2000 and 20000.

The (meth) acrylic copolymers containing hydroxyl groups of the coating composition produced according to the invention preferably fall within a glass transition temperature range of −20° C. to +80° C., calculated from the glass transition temperatures stated in the literature for the homopolymers of the individual monomers (FOX equation, see, for example, *Polymere Werkstoffe*, Batzer, 1985, page 307).

Alkyl esters of acrylic acid and/or methacrylic acid are preferably used as the monomer component for the production of the (meth)acrylic copolymers containing hydroxyl groups (component B). (Meth) acrylic is here taken to mean acrylic and/or methacrylic. Examples of these are: methyl acrylate, methyl methacrylate, ethyl acrylate, ethyl methacrylate, isopropyl methacrylate, tert.-butyl acrylate, n-butyl acrylate, n-butyl methacrylate, isobutyl acrylate, isobutyl methacrylate, cyclohexyl methacrylate, trimethylcyclohexyl methacrylate, 4-tert.-butylcyclohexyl methacrylate, 2-ethylhexyl acrylate, 2-ethylhexyl methacrylate, lauryl acrylate, lauryl methacrylate, stearyl acrylate, stearyl methacrylate, isobornyl acrylate, isobornyl methacrylate; hydroxyalkyl esters of acrylic acid or methacrylic acid, such as β-hydroxyethyl acrylate, β-hydroxyethyl methacrylate, β-hydroxypropyl acrylate, β-hydroxypropyl methacrylate, 1,4-butanediol monoacrylate, 1,4-butanediol monomethacrylate, 1,6-hexanediol monoacrylate, 1,6-hexanediol monomethacrylate.

Polyalkylene oxide mono(meth)acrylates with 2 to 10 alkylene oxide units per molecule may also be used, at least in part.

Reaction products prepared from hydroxyalkyl (meth) acrylate with ε-caprolactone may also be used.

In order to provide the (meth) acrylic copolymer with carboxyl groups, unsaturated acids may be incorporated by polymerisation, such as for example (meth) acrylic acid, maleic acid, fumaric acid and the semi-esters thereof. They are incorporated in quantities such that an acid value of 1 to 50 mg KOH/g is achieved for component B).

Comonomers differing from the (meth) acrylic monomers may also be used to produce the copolymers. Suitable compounds are, for example, vinyl monomers, such as vinyl aromatics, for example styrene, vinyltoluene, p-methylstyrene and p-tert.-butylstyrene; vinyl ethers, such as isobutyl vinyl ether; vinyl esters, such as vinyl acetate, vinyl propionate, vinyl benzoate, p-tert.-butyl vinyl benzoate and vinyl neodecanoate. The Comonomers may be used in quantities of up to 50 wt. %, for example of 10 to 50 wt. %, preferably of 10 to 30 wt. %, in each case relative to the total weight of the monomers.

Proportions of polyunsaturated monomers, for example divinylbenzene, ethylene glycol di(meth) acrylate, butanediol di(meth) acrylate, may also be used. Such monomers are added in small quantities, i.e. in quantities such that the resultant products do not gel.

The hydroxy-functional polyesters optionally used as component C) are polycondensation products prepared from polycarboxylicacids (for example dicarboxylic acids) or the anhydrides thereof and polyhydric polyols (for example diols), optionally together with monocarboxylic acids. Such polyesters are generally produced with an excess of alcohol. The OK values are 40 to 200, preferably 60 to 160 mg KOH/g, the acid values, for example, 1 to 50, preferably 5 to 30. Weight average molecular weights are, for example, 500 to 4000, preferably 1000 to 2000 g/mol.

The preferably used polycarboxylic acids are aliphatic or cycloaliphatic polycarboxylic acids. Aromatic polycarboxylic acids may, however, also be used. Examples of aliphatic polycarboxylic acids are succinic acid or the anhydride thereof, glutaric acid, adipic acid, azelaic acid, sebacic acid, butanetetracarboxylic acid and dimer fatty acid. Examples of cycloaliphatic polycarboxylic acids are tetrahydrophthalic acid or the anhydride thereof, 1,2-cyclohexanedicarboxylic acid or the anhydride thereof, 1,3-cyclohexanedicarboxylic acid, 1,4-cyclohexanedicarboxylic acid, 4-methylhexahydrophthalic acid or the anhydride thereof, endomethylenetetrahydrophthalic acid or the anhydride thereof, trimellitic acid or the anhydride thereof. Examples of aromatic polycarboxylic acids are o-phthalic acid or the anhydride thereof, isophthalic acid and terephthalic acid.

The polyesters may also contain small proportions of co-condensed maleic anhydride. Natural and synthetic monocarboxylic acids, such as for example benzoic acid, tert.-butyl benzoic acid, lauric acid, isononanoic acid and fatty acids from naturally occurring oils, may optionally be used together with the above-stated polycarboxylic acids.

Suitable polyol components for production of the polyesters are diols, such as ethylene glycol, diethylene glycol, triethylene glycol, polyethylene glycols, propanediols, polypropylene glycols, butanediols, hexanediols, neopentyl glycol, cyclohexanediol, cyclohexanedimethanol, trimethylpentanediol, ethylbutylpropanediol, together with polyhydric alcohols, such as for example trimethylolethane, trimethylolpropane, ditrimethylolpropane, glycerol, pentaerythritol, dipentaerythritol, trishydroxyethylisocyanurate.

The polyesters may contain glycidyl esters of α,α-disubstituted monocarboxylic acids and ε-caprolactone as a modifying component.

The coating compositions according to the invention additionally contain conventional lacquer crosslinking agents as component D), for example and preferably amino resins and/or conventional blocked and/or unblocked lacquer di- and polyisocyanates.

The coating compositions according to the invention particularly preferably contain amino resins as component D).

Conventional amino resins may be used. Examples of amino resins are alkylated condensation products obtained by the reaction of aminotriazines and amidotriazines with aldehydes. Using known industrial methods, compounds bearing amino or amido groups such as melamine, benzoguanamine, dicyanodiamide, urea, N,N'-ethyleneurea are condensed with aldehydes, in particular formaldehydes, in the presence of alcohols, such a methyl, ethyl, propyl, iso-butyl, n-butyl and hexyl alcohol. The reactivity of such amino resins is determined by their degree of condensation, the ratio of the amine or amide component to the formaldehyde and by the nature of the etherifying alcohol used. Melamines etherified with n- or iso-butanol and having a degree of etherification of ≦1.0 are preferably used.

The amino resins may also be present together with polyisocyanates. The proportion of amino resins in such mixtures is preferably at least 50 wt. %, relative to the weight of component D).

The polyisocyanates which may be used mixed with the amino resins, but also alone as crosslinking agent D) are di- and polyisocyanates which differ from component A). They may correspond, for example, to those defined in a5).

The polyisocyanate crosslinking agents may be partially or, if a coating composition is desired which may be stored for an extended period, i.e. a one-component coating composition, completely blocked with monofunctional compounds containing active hydrogen. Selection of the blocking agent which may be thermally eliminated to reform the free isocyanate groups is determined by the stoving conditions prevailing during curing of the coating composition according to the invention. Examples of suitable blocking agents are the same as those already stated for a6). The polyisocyanate crosslinking agents are preferably used in capped form.

In addition to the already stated solvents, the coating compositions according to the invention may additionally contain conventional lacquer auxiliary substances, for example levelling agents, for example based on (meth) acrylic homopolymers, silicone oils, plasticisers such as phosphoric acid, phthalic acid or citric acid esters, flatting agents, such as pyrogenic silicon dioxide, rheological additives, such as microgels, NAD (=non-aqueous dispersions), disubstituted ureas ("sagging control agents"), hydrogenated castor oil, curing accelerators for the reaction of the (meth)acrylic copolymer with amino resins or the carboxy-functional blocked urethane prepolymers, for example phosphoric acid, phosphoric acid esters, dicarboxylic acid semi-esters, citric acid; organic metal salts, such as dibutyltin dilaurate, zinc naphthenate, together with compounds containing tertiary amino groups, such as triethylamine.

The coating compositions according to the invention may be formulated in aqueous and non-aqueous form. When formulating aqueous coating compositions, it is convenient to use components A) and B) and optionally C) which have an acid value range of above approximately 30. These components containing acidic functional groups may then be partially or entirely neutralised with amines and then converted into the aqueous phase by dilution with water.

The coating compositions according to the invention are particularly suitable for the production of a transparent topcoat lacquer layer.(clear lacquer layer) in the production of stove-drying multilayer coatings. The topcoat layer may be applied, for example, wet-on-wet, whereupon the two layers are cured together. This invention thus also relates to the process for the production of multi-layer lacquer coatings or to the use of the coating compositions for the production thereof. The solvent-based coating compositions according to the invention may here be applied as transparent topcoat lacquers onto layers of aqueous or solvent-based base lacquers for curable multi-layer coatings.

Pigmented coating compositions may also be produced. Conventional organic and/or inorganic coloured pigments and/or extenders such as titanium dioxide, micronised titanium dioxide, iron oxide pigments, carbon black, silicon dioxide, barium sulphate, micronised mica, talcum, azo pigments, phthalocyanine pigments, quinacridone or pyrrolopyrrole pigments may be used to this end.

The coating compositions according to the invention are applied using known methods, for example spraying, dipping, rolling or knife coating. The topcoat lacquer coating is here applied onto the substrate which has optionally previously been provided with further lacquer layers. The coating compositions according to the invention may also be applied by spraying using supercritical carbon dioxide as the solvent. The content of organic solvents may here be greatly reduced. After a flashing-off phase, the applied coating composition is crosslinked, preferably by heating. Storing temperatures are preferably between 110° and 160° C., particularly preferably between 120° and 150° C. Curing times are, for example, of the order of 20 to 40 minutes. The thickness of the stoved film is approximately 15–50 µm. The resultant lacquer coating is a crosslinked, hard, glossy film. A preferred embodiment is the application of the coating composition according to the invention as a clear lacquer overcoat on a base lacquer. Application may here be performed wet-on-wet or the base lacquer may previously be dried by heating. Particularly good adhesion is achieved between the two layers.

The coating compositions formulated according to the invention as clear lacquers may be used, for example, to overcoat base lacquers which may contain conventional topcoat lacquer pigments, the base lacquers preferably contain effect pigments, such as for example metallic pigments. The binder of the base lacquer is preferably based on polyester, polyurethane or acrylate resins. These binders may optionally be crosslinked by means of crosslinking agents, for example melamine or isocyanate derivatives.

The coating compositions according to the invention are particularly suitable as topcoat lacquers or clear lacquers which are preferably used in the automotive sector, but also in other sectors. The coating composition according to the invention is particularly suitable for use in multi-layer lacquer coating in automotive original lacquer coating, but it may, however, also be used for other purposes, such as, for example, domestic appliances or in the furniture industry.

The coating compositions according to the invention are particularly suitable for the production of a transparent topcoat layer of a stovable multi-layer lacquer coating. They are particularly suitable for original lacquer coating of automotive bodywork or components thereof.

The coating compositions according to the invention are distinguished by an elevated application solids content of the order of, for example, 44 to 60 wt. %, relative to the total applicable coating composition. The topcoat lacquer layers, for example clear lacquer layers, produced using the coating compositions according to the invention are distinguished by superior acid resistance, in particular sulphuric acid resistance.

The invention is illustrated by the following examples. All parts are parts by weight.

Production of urethane prepolymers

EXAMPLE 1

219.0 g (1.422 mol) of hexahydrophthalic anhydride and 369.6 g (2.310 mol) of 2-ethyl-2-butyl-1,3-propanediol are weighed into a reaction apparatus suitable for polyester resin synthesis and slowly melted. Once the reaction components have liquefied, the mixture is heated to 210° C. within 5 hours while being stirred with elimination of water. The temperature is then raised to 240° C. without the column overhead temperature exceeding 100° C. Once an acid value of 7.5 has been reached, the mixture is cooled to 120° C. and diluted with 450 g of butyl acetate. 315.8 g (1.422 mol) of isophorone diisocyanate are then added and reacted at 100° C. until an NCO value of 5.0 is achieved. The remaining free NCO groups are blocked at 100° C. with 123.0 g (1.414 mol) of methyl ethyl ketoxime. The urethane prepolymer solution has a solids content of 55.0%, a viscosity of 260 mPa·s/25° C., an acid value of 5.5 mg KOH/g and an NCO value of <0.1.

EXAMPLE 2

241.9 g (1.570 mol) of hexahydrophthalic anhydride and 336.7 g (2.551 mol) of 2,2-diethyl-1,3-propanediol are weighed into a reaction apparatus suitable for polyester resin synthesis and slowly melted. Once the reaction components have liquefied, the mixture is heated to 210° C. within 5 hours while being stirred with elimination of water. The temperature is then raised to 240° C. without the column overhead temperature exceeding 100° C. Once an acid value of 7.8 has been reached, the mixture is cooled to 120° C. and diluted with 450 g of butyl acetate. 348.7 g (1.570 mol) of isophorone diisocyanate are then added and reacted at 100° C. until an NCO value of 5.4 is achieved. The remaining free NCO groups are blocked at 100° C. with 101.4 g (1.166 mol) of methyl ethyl ketoxime. The urethane prepolymer solution has a solids content of 54.9%, a viscosity of 230 mPa·s/25° C., an acid value of 5.6 mg KOH/g and an NCO value of <0.1.

EXAMPLE 3

139.2 g (0.904 mol) of hexahydrophthalic anhydride, 144.6 g (0.904 mol) of 2-ethyl-2-butyl-1,3-propanediol and 55.5 g (0.603 mol) of glycerol are weighed into a reaction apparatus suitable for polyester resin synthesis and slowly melted. Once the reaction components have liquefied, the mixture is heated to 210° C. within 5 hours while being stirred with elimination of water. The temperature is then raised to 240° C. without the column overhead temperature exceeding 100° C. Once an acid value of 29.2 has been reached, the mixture is cooled to 120° C. and diluted with 450 g of butyl acetate. 476.6 g (2.147 mol) of isophorone diisocyanate are then added and reacted at 100° C. until an NCO value of 12.8 is achieved. The remaining free NCO groups are blocked at 100° C. with 196.1 g (2.254 mol) of methyl ethyl ketoxime. The urethane prepolymer solution has a solids content of 55.0%, a viscosity of 1480 mPa·s/25° C., an acid value of 12.5 mg KOH/g and an NCO value of <0.1.

EXAMPLE 4

185.5 g (1.204 mol) of hexahydrophthalic anhydride, 192.7 g (1.204 mol) of 2-ethyl-2-butyl-1,3-propanediol and 107.6 g (0.803 mol) of 1,2,6-hexanetriol are weighed into a reaction apparatus suitable for polyester resin synthesis and slowly melted. Once the reaction components have liquefied, the mixture is heated to 210° C. within 5 hours while being stirred with elimination of water. The temperature is then raised to 240° C. without the column overhead temperature exceeding 100° C. Once an acid value of 28.2 has been reached, the mixture is cooled to 120° C. and diluted with 450 g of butyl acetate. 376.4 g (1.695 mol) of isophorone diisocyanate are then added and reacted at 100° C. until an NCO value of 4.1 is achieved. The remaining free NCO groups are blocked at 100° C. with 154.9 g (1.780 mol) of methyl ethyl ketoxime. The urethane prepolymer solution has a solids content of 55.0%, a viscosity of 7000 mPa·s/25° C., an acid value of 16.9 mg KOH/g and an NCO value of <0.1.

EXAMPLE 5

165.1 g (1.072 mol) of hexahydrophthalic anhydride, 126.5 g (1.072 mol) of 1,6-hexanediol, 65.8 g (0.715 mol) of glycerol and 47.8 g (0.357 mol) of dimethylolpropionic acid are weighed into a reaction apparatus suitable for polyester synthesis and slowly melted. Once the reaction components have liquefied, the mixture is heated to 210° C. within 5 hours while being stirred with elimination of water. The temperature is then raised to 240° C. without the column overhead temperature exceeding 100° C. Once an acid value of 18.8 mg KOH/g has been reached, the mixture is cooled to 120° C. and diluted with 450 g of butyl acetate. 436.5 g (1.966 mol) of isophorone diisocyanate are then added and reacted at 100° C. until an NCO value of 5.4 is achieved. The remaining free NCO groups are blocked at 100° C. with 179.6 g (1.966 mol) of methyl ethyl ketoxime. After dilution with 270 g of butyl acetate, the urethane prepolymer solution has a solids content of 55.4%, a viscosity of 2200 mPa·s/25° C. and an NCO value of <0.1. The acid value is 7.2 mg KOH/g relative to the solid resin.

EXAMPLE 6

250.9 g (1.629 mol) of hexahydrophthalic anhydride, 298.5 g (2.530 mol) of 1,6-hexanediol are weighed into a reaction apparatus suitable for polyester synthesis and slowly melted. Once the reaction components have liquefied, the mixture is heated to 210° C. within 5 hours while being stirred with elimination of water. The temperature is then raised to 240° C. without the column overhead temperature exceeding 100° C. Once an acid value of 11.8 mg KOH/g has been reached, the mixture is cooled to 120° C. and diluted with 450 g of butyl acetate. 361.7 g (1.629 mol) of isophorone diisocyanate are then added and reacted at 100° C. until an NCO value of 3.8 is achieved. The remaining free NCO groups are blocked at 100° C. with 117.0 g (1.280 mol) of methyl ethyl ketoxime. After dilution with 270 g of butyl acetate, the urethane prepolymer solution has a solids content of 55.1%, a viscosity of 210 mPa·s/25° C. and an NCO value of <0.1. The acid value is 5.8 mg KOH/g relative to the solid resin.

EXAMPLE 7

160.7 (1.043 mol) of hexahydrophthalic anhydride, 150.2 g (1.043 mol) of cyclohexanedimethanol, 64.0 g (0.696 mol) of glycerol and 47.8 g (0.357 mol) of dimethylolpropionic acid are weighed into a reaction apparatus suitable for polyester synthesis and slowly melted. Once the reaction components have liquefied, the mixture is heated to 210° C. within 5 hours while being stirred with elimination of water. The temperature is then raised to 240° C. without the column overhead temperature exceeding 100° C. Once an acid value of 20.4 mg KOH/g has been reached, the mixture is cooled to 120° C. and diluted with 450 g of butyl acetate. 423.7 g (1.908 mol) of isophorone diisocyanate are then added and reacted at 100° C. until an NCO value of 5.7 is achieved. The remaining free NCO groups are blocked at 100° C. with 174.3 g (1.908 mol) of methyl ethyl ketoxime. After dilution with 270 g of butyl acetate, the urethane prepolymer solution has a solids content of 55.6%, a viscosity of 5900 mPa·s/25° C. and an NCO value of <0.1. The acid value is 7.8 mg KOH/g relative to the solid resin.

EXAMPLE 8

235.6 (1.530 mol) of hexahydrophthalic anhydride, 341.2 g (2.369 mol) of cyclohexanedimethanol are weighed into a reaction apparatus suitable for polyester synthesis and slowly melted. Once the reaction components have liquefied, the mixture is heated to 210° C. within 5 hours while being stirred with elimination of water. The temperature is then raised to 240° C. without the column overhead temperature exceeding 100° C. Once an acid value of 11.9 mg KOH/g has been reached, the mixture is cooled to 120° C. and diluted with 450 g of butyl acetate. 339.6 g (1.530 mol) of isophorone diisocyanate are then added and reacted at 100° C. until an NCO value of 3.5 is achieved. The remaining free NCO groups are blocked at 100° C. with 109.8 g (1.202 mol) of methyl ethyl ketoxime. After dilution with 270 g of butyl acetate, the urethane prepolymer solution has a solids content of 55.5%, a viscosity of 410 mPa·s/25° C. and an NCO value of <0.1. The acid value is 5.5 mg KOH/g relative to the solid resin.

EXAMPLE 9

Production of a (meth)acrylic copolymer 173 g of Solvesso 150 (commercial product of Shell AG) and 5 g of n-butanol are initially introduced into a 2 liter, three-necked, ground-glass flask equipped with a stirrer, contact thermometer, bulb condenser and dropping funnel and heated to 152° C. while being stirred and refluxed. Over a period of 6 hours, a mixture of 67 g of acrylic acid, 160 g of styrene, 150 g of butyl acrylate, 65 g of 2-hydroxyethyl acrylate, 220 g of Cardura E10 (commercial product of Shell AG), 16 g of di-tert.-butyl peroxide and 22 g of tert.-butyl peroctoate was continuously apportioned. The batch is then post-polymerised for 4 hours at 150° C., cooled to 80° C.

and diluted with 62 g of Solvesso 100 and 60 g of n-butanol. The polymer solution had a solids content of 70.1%, an acid value of 8.5, an OH value of 81 and a viscosity of 1490 mPa·s/25° C.

Production of clear lacquers

EXAMPLE 10

A single-component clear lacquer was produced by homogeneously mixing 37.3 parts of the (meth) acrylic copolymer from example 9, 20.5 parts of a conventional commercial, 58% solution of a highly reactive butanol-etherified melamine resin in butanol/xylene, 17.3 parts of the urethane prepolymer from example 1, 0.5 parts of a conventional commercial benzotriazole type light stabiliser, 0.5 parts of a conventional commercial HALS type light stabiliser, 0.5 parts of a 10% dibutyltin dilaurate solution in xylene, 0.2 parts of silicone oil, 1 part of n-butanol, 1.4 parts of diethylene glycol monobutyl ether and 20.8 parts of Solvesso 100 (commercial product of Shell AG).

EXAMPLE 11

A single-component clear lacquer was produced in a similar manner to example 10 using 17.3 parts of the urethane prepolymer from example 3.

EXAMPLE 12

A single-component clear lacquer was produced in a similar manner to example 10 using 17.3 parts of the urethane prepolymer from example 4.

EXAMPLE 13

A single-component clear lacquer was produced in a similar manner to example 10 using 17.3 parts of the urethane prepolymer from example 5.

EXAMPLE 14

A single-component clear lacquer was produced in a similar manner to example 10 using 17.3 parts of the urethane prepolymer from example 6.

EXAMPLE 15

A single-component clear lacquer was produced in a similar manner to example 10 using 17.3 parts of the urethane prepolymer from example 7.

EXAMPLE 16

A single-component clear lacquer was produced in a similar manner to example 10 using 17.3 parts of the urethane prepolymer from example 8.

Bodywork steel sheets precoated with conventional commercial cathodic electrocoating lacquer used in automotive original lacquer coating (18 µm) and conventional commercial surfacer (35 µm) are lacquer coated with conventional commercial water-borne metallic base lacquer to a dry film thickness of 15 µm and predried for 6 minutes at 80° C. Immediately thereafter, the clear lacquer from the clear lacquer examples 10 to 13 is sprayed on wet-on-wet to a dry film thickness of 35 µm and, after 5 minutes flashing off at room temperature, stored for 20 minutes at 140° C. (object temperature).

Comparison tests with prior art lacquers were performed in a similar manner. The results obtained are shown in the following table. The tests were performed using general industrial standards. The sulphuric acid resistance of the clear lacquers was tested by the droplet test with 10% or 38% $H_2SO_4$. The test sheets are placed on a hotplate and heated to 65° C. Care must be taken here to ensure that the sheets lie flat in order to ensure optimum heat transfer. At the end of the heating phase, i.e. at 65° C., one droplet is applied to the clear lacquer surface per minute. The total time is 30 minutes. On completion of the test period, the lacquer coating is washed with water. If necessary, a brush may also be used for cleaning.

Sulphuric acid resistance is stated as the time of exposure in minutes at which the first visible film change (swelling), damage (dulling) and base lacquer attack occurred.

TABLE 1

| | Clear lacquers according to the invention: | | | |
|---|---|---|---|---|
| Example | 10 | 11 | 12 | 13 |
| Yellowing | none | none | none | none |
| Application solids content (%) | 50.3 | 48.0 | 44.1 | 46.5 |
| Gloss 20° | 90 | 90 | 89 | 89 |
| Pendulum hardness (oscillations) | 76 | 81 | 81 | 84 |
| Sulphuric acid test, 10% $H_2SO_4$, 30', 60° C. | | | | |
| Swelling | 19 | 16 | 15 | 19 |
| Dulling | 25 | 24 | 24 | 25 |
| Basecoat attack | >30 | 26 | 30 | >30 |
| Sulphuric acid test, 38% $H_2SO_4$, 30', 60° C. | | | | |
| Swelling | 13 | 16 | 10 | 14 |
| Dulling | 19 | 22 | 19 | 16 |
| Basecoat attack | >30 | 30 | 30 | 29 |
| Pencil hardness | HB | HB | HB | HB |

| | Clear lacquers according to the invention: | | | Comparison clear lacquers: | |
|---|---|---|---|---|---|
| | | | | JP 158079 | DE-OS 4204518 |
| Example | 14 | 15 | 16 | 1 | 7 |
| Yellowing | none | none | none | severe | none |
| Application solids content (%) | 47.2 | 46.6 | 46.8 | 58.1 | 50.5 |
| Gloss 20° | 89 | 89 | 89 | 29 | 85 |
| Pendulum hardness (oscillations) | 58 | 87 | 82 | 38 | 64 |
| Sulphuric acid test, 10% $H_2SO_4$, 30', 60° C. | | | | | |
| Swelling | 19 | 21 | 21 | 10 | 13 |
| Dulling | 27 | 27 | 25 | 13 | 17 |
| Basecoat attack | 30 | 30 | >30 | 19 | 19 |
| Sulphuric acid test, 38% $H_2SO_4$, 30', 60° C. | | | | | |
| Swelling | 16 | 12 | 12 | 2 | 3 |
| Dulling | 18 | 16 | 13 | 11 | 11 |
| Basecoat attack | 28 | 28 | 25 | 15 | 13 |
| Pencil hardness | 2B | 2B | B | 2B | HB |

We claim:

1. A coating composition made of polymeric binders comprising one or more hydroxyl-functional (meth)acrylic copolymers as component B one or more carboxy-functional, blocked urethane prepolymers as component A, and one or more crosslinking agents as component C, wherein A) the one or more carboxy-functional urethane prepolymers have a hydroxyl value of 0 to 80, an acid value of 5 to 50, a weight average molecular weight ($M_w$) of 500 to 5000, are present at 5.0 to 40.0 wt. %, and are obtained by reacting a1) 10 to 50 mol. % of one or more alkanediols or cycloalkanediols, a2) 10 to 30 mol. % of one or more polycarboxylic acids or the anhydrides thereof, a3) 0 to 30 mol. % of one or more polyols with at least three OH groups per molecule, a4) 0 to 20 mol. % of one or more hydroxycarboxylic acids with at least one hydroxyl group and at least one carboxyl group per molecule, a5) 10 to 40 mol. % of one or more aliphatic, cycloaliphatic and/or araliphatic di- and/or polyisocyanates and a6) 10 to 40 mol. % of one or more monofunctional blocking agents for free NCO groups, wherein the sum of the mol. % of a1) to a6) mounts to 100 mol. % of component A, B) the one or more (meth)acrylic copolymers containing hydroxyl groups have a weight average molecular mass ($M_w$) of 2000 to 20000, an acid value of 1 to 50 mg KOH/g, an OH value of 30 to 200 and are present at 30.0 to 70.0 wt. %, p1 C) the one or more crosslinking agents are present at 5.0 to 40.0 wt. % wherein the sum of wt. % of components A) to C) mounts to 100 wt. % of the polymeric binders in the coating composition.

2. A coating composition according to claim 1, wherein component A) is obtained by forming a polycondensation intermediate from components a1), a2), subsequently reacting this intermediate with component a5) in a quantity such that an excess of free NCO groups is present and subsequently blocking the free NCO groups with component a6).

3. A coating composition according to claim 1, wherein one or more 2,2-dialkylalkane-diols are used as component Aa1).

4. A coating composition according to claim 1, wherein one or more aliphatic and/or cycloaliphatic dicarboxylic acids are used as component Aa2).

5. A coating composition according to claim 1 wherein one or more polyols with at least one secondary OH group per molecule are used as component Aa3).

6. A coating composition according to claim 1 wherein one or more hydroxycarboxylic acids with at least one tertiary attached carboxyl group are used as component Aa4).

7. A coating composition according to claim 1, wherein one or more amino resins are used as component C).

8. A composition according to claim 7 wherein one or more polyisocyanates are used with one or more amino resins as component C).

9. A coating composition according to claim 1, wherein one or more polyisocyanates are used as component C).

10. A coating composition according to claim 1, which is formulated without pigments or with transparent pigments as a clear lacquer.

11. A process for the production of a multi-layer lacquer coating comprising applying a base lacquer onto a substrate and overcoating the resultant base lacquer layer with a topcoat lacquer layer of a coating composition according to claim 1.

12. A process according to claim 11, wherein the substrate is automotive bodywork or components thereof.

13. A process according to claim 11 wherein the resultant base lacquer layer either is dried or is wet when the topcoat lacquer layer is applied.

14. A transparent topcoat layer of a multi-layer coating on a substrate which is produced according to the process of claim 11.

15. A coating composition according to claim 1 further comprising lacquer additives, pigments and solvents.

16. A coating composition made of polymeric binders comprising one or more carboxy-functional, blocked urethane prepolymers as component A, one or more hydroxyl-functional (meth)acrylic copolymers as component B, one or more crosslinking agents as component C, and one or more hydroxy-functional polyesters as component D, wherein A) the one or more carboxy-functional urethane prepolymers have a hydroxyl value of 0 to 80, an acid value of 5 to 50, a weight average molecular weight ($M_w$) of 500 to 5000, are present at 5.0 to 40.0 wt. %, and are obtained by reacting a1) 10 to 50 mol. % of one or more alkanediols or cycloalkanediols, a2) 10 to 30 mol. % of one or more polycarboxylic acids or the anhydrides thereof, a3) 0 to 30 mol. % of one or more polyols with at least three OH groups per molecule, a4) 0 to 20 mol. % of one or more hydroxycarboxylic acids with at least one hydroxyl group and at least one carboxyl group per molecule, a5) 10 to 40 mol. % of one or more aliphatic, cycloaliphatic and/or araliphatic di- and/or polyisocyanates and a6) 10 to 40 mol. % of one or more monofunctional blocking agents for free NCO groups, wherein the sum of the mol. % of a1) to a6) amounts to 100 mol. % of component A, B) the one or more (meth)acrylic copolymers containing hydroxyl groups have a weight average molecular mass ($M_w$) of 2000 to 20000, an acid value of 1 to 50 mg KOH/g, an OH value of 30 to 200 and are present at 30.0 to 70.0 wt. %, C) the one or more crosslinking agents are present at 5.0 to 40.0 wt. %;

D) the one or more hydroxy-functional polyesters have an OH value of 40 to 200, and are present at up to 50.0 wt. % of the weight of polymeric binders in the coating composition; and, wherein the sum of wt. % of components A) to D) mounts to 100 wt. % of the polymeric binders in the coating composition.

17. A coating composition according to claim 16, wherein one or more polyesters with a hydroxyl value of 40–200, an acid value of 1 to 50 and a weight average molecular weight ($M_w$) of 500 to 4000 are used as component D).

* * * * *